US009985951B2

(12) United States Patent
Sugaya (10) Patent No.: US 9,985,951 B2
(45) Date of Patent: *May 29, 2018

(54) USER TERMINAL AND METHOD FOR SCREEN SHARING

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/198,202

(22) Filed: Jun. 30, 2016

(65) Prior Publication Data

US 2017/0034146 A1    Feb. 2, 2017

(30) Foreign Application Priority Data

Jul. 30, 2015   (JP) .................................. 2015-150251

(51) Int. Cl.
*H04L 29/06* (2006.01)
*H04L 29/08* (2006.01)
*H04W 12/06* (2009.01)

(52) U.S. Cl.
CPC .............. *H04L 63/08* (2013.01); *H04L 63/04* (2013.01); *H04L 63/126* (2013.01); *H04L 67/104* (2013.01); *H04W 12/06* (2013.01)

(58) Field of Classification Search
CPC ....... H04L 63/08; H04L 63/04; H04L 63/126; H04L 67/104; H04W 12/06
See application file for complete search history.

(56) References Cited

U.S. PATENT DOCUMENTS

| | | | | |
|---|---|---|---|---|
| 2007/0113092 A1* | 5/2007 | Nishida | ...................... | H04L 9/32 713/171 |
| 2014/0086105 A1* | 3/2014 | Kang | ...................... | H04L 67/26 370/259 |
| 2015/0058735 A1* | 2/2015 | Nagase | ..................... | H04N 7/15 715/733 |
| 2015/0281644 A1* | 10/2015 | Arai | ......................... | H04N 7/15 348/14.07 |

FOREIGN PATENT DOCUMENTS

JP    2001-256137    9/2001

* cited by examiner

*Primary Examiner* — Ghodrat Jamshidi
(74) *Attorney, Agent, or Firm* — Lex IP Meister, PLLC (57) ABSTRACT

A user terminal 10 for screen sharing with a destination user terminal 100 receives a connection request for screen sharing from a user; issues an authentication number to specify the destination user terminal 100 with which the user terminal 10 is to perform screen sharing, in response to the connection request; directly connects with the destination user terminal 100; allows the destination user terminal 100 to display a prompt to ask for an input of the authentication number; authenticates the authentication number in response to receiving the authentication number from the destination user terminal 100; and sequentially transceives shared screen data to and from the destination user terminal 100 if the authentication number is appropriate.

8 Claims, 11 Drawing Sheets

RATE LIMITATION TABLE

| NUMBER OF TERMINAL CONNECTIONS | FPS |
|---|---|
| 1 | 30 |
| 2 | 25 |
| 3 | 20 |

USER TERMINAL AND METHOD FOR SCREEN SHARING

CROSS REFERENCE TO RELATED APPLICATIONS

This application claims priority to Japanese Patent Application No. 2015-150251 filed on Jul. 30, 2015, the entire contents of which are incorporated by reference herein.

TECHNICAL FIELD

The present invention relates to a user terminal and a method for screen sharing with a destination user terminal.

BACKGROUND ART

Recently, a public line network such as the Internet has allowed terminals to perform screen sharing. Terminals performing such screen sharing transceive shared screen data indirectly through a server or directly through a P2P network.

Patent Document 1 discloses the constitution that allows only specific terminals to transceive shared screen data by permitting only specific IP addresses to access the server and then authenticating the users.

CITATION LIST

Patent Literature

Patent Document 1: JP 2001-256137 A

SUMMARY OF INVENTION

However, when transceived through a P2P network, shared screen data may be shared with unintended terminals. This may cause security risks.

Moreover, the constitution of Patent Document 1 is less convenient because requiring to previously register users and IP addresses which can previously transceive shared screen data.

An objective of the present invention is to provide a user terminal and a method for screen sharing, which attempt security improvement, enable an easy network configuration, and enhance the user-friendliness when allowing a terminal to perform screen sharing.

The first aspect of the present invention provides a user terminal for screen sharing with a destination user terminal, including:

a connection request receiving unit that receives a connection request for screen sharing from a user;

an authentication number issuing unit that issues an authentication number to specify the destination user terminal with which the user terminal is to perform screen sharing, in response to the connection request;

a P2P connection unit that directly connects with the destination user terminal;

an input receiving unit that allows the destination user terminal to display a prompt to ask for an input of the authentication number;

an authentication unit that authenticates the authentication number in response to receiving the authentication number from the destination user terminal; and a screen data transceiving unit that sequentially transceives shared screen data to and from the destination user terminal if the authentication number is appropriate.

According to the first aspect of the present invention, a user terminal for screen sharing with a destination user terminal receives a connection request for screen sharing from a user; issues an authentication number to specify the destination user terminal with which the user terminal is to perform screen sharing, in response to the connection request; directly connects with the destination user terminal; allows the destination user terminal to display a prompt to ask for an input of the authentication number; authenticates the authentication number in response to receiving the authentication number from the destination user terminal; and sequentially transceives shared screen data to and from the destination user terminal if the authentication number is appropriate.

The first aspect of the present invention falls into the category of a user terminal, but the category of a method for screen sharing has the same functions and effects.

The second aspect of the present invention provides the user terminal according to the first aspect of the present invention, in which the P2P connection unit connects with two or more destination user terminals, the user terminal further including a transceiving limitation unit that limits the shared screen data transmission rate if the number of the destination user terminals is a predetermined number or more.

According to the second aspect of the present invention, the user terminal according to the first aspect of the present invention connects with two or more destination user terminals and limits the shared screen data transmission rate if the number of the destination user terminals is a predetermined number or more.

The third aspect of the present invention provides the user terminal according to the first aspect of the present invention, further including a number-of-connected user terminal notification unit that counts the destination user terminal to which shared screen data is transmitted and displays the counted number of the destination user terminal on the user terminal itself or the destination user terminal.

According to the third aspect of the present invention, the user terminal according to the first aspect of the present invention counts the destination user terminal to which shared screen data is transmitted and displays the counted number of the destination user terminal on the user terminal itself or the destination user terminal.

The fourth aspect of the present invention provides the user terminal according to the first aspect of the present invention, further including an elapsed-time judging unit that judges whether or not a predetermined time has passed since the authentication number was issued, in which the input receiving unit does not receive an input of the authentication number if the predetermined time has passed.

According to the fourth aspect of the present invention, the user terminal according to the first aspect of the present invention judges whether or not a predetermined time has passed since the authentication number was issued, and does not receive an input of the authentication number if the predetermined time has passed.

The fifth aspect of the present invention provides the user terminal according to the first aspect of the present invention, in which the screen data transceiving unit sequentially transmits shared screen data if the destination user terminal is connected with a local network with which the user terminal is connected.

According to the fifth aspect of the present invention, the user terminal according to the first aspect of the present invention sequentially transmits shared screen data if the destination user terminal is connected with a local network with which the user terminal is connected.

The sixth aspect of the present invention provides a method for screen sharing with a destination user terminal includes the steps of:

receiving a connection request for screen sharing from a user;

issuing an authentication number to specify the destination user terminal with which the user terminal is to perform screen sharing, in response to the connection request;

directly connecting with the destination user terminal;

allowing the destination user terminal to display a prompt to ask for an input of the authentication number;

authenticating the authentication number in response to receiving the authentication number from the destination user terminal; and sequentially transceiving shared screen data to and from the destination user terminal if the authentication number is appropriate.

The seventh aspect of the present invention provides a system for screen sharing includes a user terminal and a destination user terminal, the user terminal and the destination user terminal performing screen sharing with each other, in which the user terminal includes:
  a connection request receiving unit that receives a connection request for screen sharing from a user;
  an authentication number issuing unit that issues an authentication number to specify the destination user terminal with which the user terminal is to perform screen sharing, in response to the connection request;
  a P2P connection unit that directly connects with the destination user terminal;
  an input receiving unit that allows the destination user terminal to display a prompt to ask for an input of the authentication number;
  an authentication unit that authenticates the authentication number in response to receiving the authentication number from the destination user terminal;
  a screen data transceiving unit that sequentially transceives shared screen data to and from the destination user terminal if the authentication number is appropriate, and the destination user terminal receives and displays the shared screen data transmitted from the user terminal.

The present invention can provide a user terminal and a method for screen sharing, which attempt security improvement, enable an easy network configuration, and enhance the user-friendliness when allowing a terminal to perform screen sharing.

DESCRIPTION OF EMBODIMENTS

Embodiments of the present invention will be described below with reference to the attached drawings. However, this is illustrative only, and the technological scope of the present invention is not limited thereto.

Overview of Screen Sharing System 1

Figure 1:
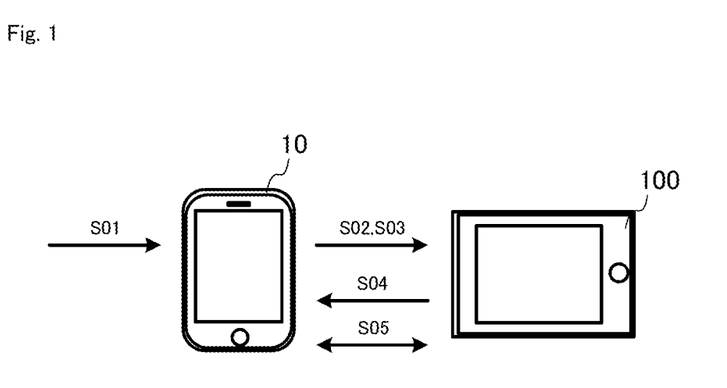
FIG. 1 shows a schematic diagram showing the screen sharing system 1.

The overview of the present invention will be described below with reference to FIG. 1. The screen sharing system 1 includes a user terminal 10 and a destination user terminal 100.

The user terminal 10 is communicatively connected with the destination user terminal 100. The user terminal 10 performs screen sharing with the destination user terminal 100. The user terminal 10 receives a connection request for screen sharing from the user. The user terminal 10 issues an authentication number to specify the destination user terminal with which the user terminal 10 is to perform screen sharing, in response to this connection request. The user terminal 10 directly connects with the destination user terminal 100 through a P2P network. The user terminal 10 authenticates the authentication number in response to receiving the authentication number from the destination user terminal 100. The user terminal 10 sequentially transceives shared screen data to and from the destination user terminal 100 if the authentication number is appropriate.

Moreover, the user terminal 10 directly connects with two or more destination user terminals 100 through a P2P network. The user terminal 10 limits the shared screen data transmission rate if the number of the destination user terminals 100 is a predetermined number or more.

The user terminal 10 counts the destination user terminals 100 to which shared screen data is transmitted and displays the counted number of the destination user terminals 100 on the user terminal 10 itself or the destination user terminals 100.

The user terminal 10 judges whether or not a predetermined time has passed since the user terminal 10 issued the authentication number. If judging that a predetermined time has passed since the user terminal 10 issued the authentication number, the user terminal 10 does not receive an input of the authentication number.

The user terminal 10 sequentially transmits shared screen data if the destination user terminal 100 is connected with a local network with which the user terminal 10 is connected.

First, the user terminal 10 receives a connection request for screen sharing from the user (step S01). In the step S01, the user terminal 10 receives a connection request by receiving an instruction to start an application that performs screen sharing, from the user.

The user terminal 10 acquires data on the destination user terminal 100 with which the user terminal 10 is to perform screen sharing, to recognize the destination user terminal 100. The user terminal 10 transmits a connection request to the recognized destination user terminal 100 (step S02).

The destination user terminal 100 directly connects with the user terminal through P2P connection based on the connection request transmitted from the user terminal 10.

The user terminal 10 issues an authentication number. The user terminal 10 displays a prompt to ask for an input of the authentication number on the destination user terminal 100 (step S03).

The destination user terminal 100 receives an input of the authentication number and transmits the received authentication number to the user terminal 10 (step S04).

The user terminal 10 receives the authentication number transmitted from the destination user terminal 100 and authenticates this authentication number. If the authentication number is appropriate, the user terminal 10 sequentially transceives shared screen data to and from the destination user terminal 100 (step S05).

In the step S05, when sequentially transceiving shared screen data to and from two or more destination user terminals 100 through P2P connection, the user terminal 10 limits the transmission rate as the shared screen data transmission rate according to the number of the connected destination user terminals 100.

On the other hand, if the authentication number received from the destination user terminal 100 is different from the issued authentication number, the user terminal 10 displays an alert notification on the destination user terminal 100. In this case, the user terminal 10 may disconnect from the destination user terminal 100.

System Configuration of Screen Sharing System 1

Figure 2:
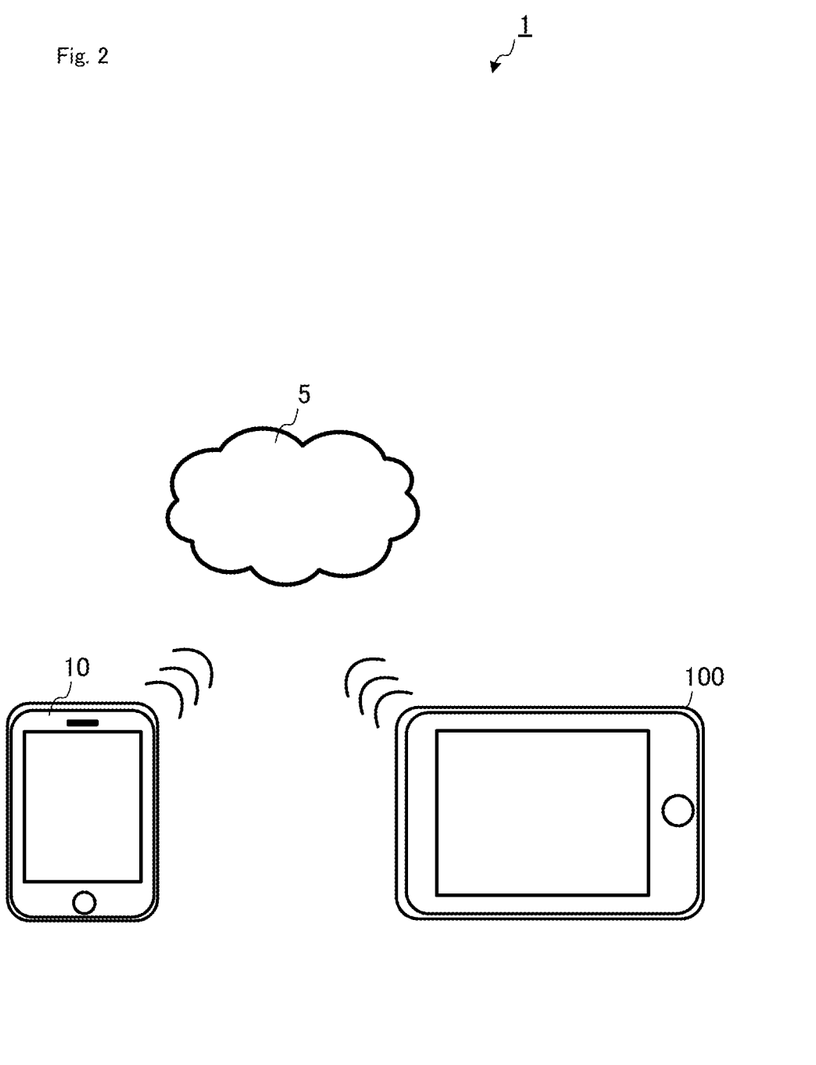
FIG. 2 shows an overall configuration diagram of the screen sharing system 1.

FIG. 2 shows a configuration diagram of the screen sharing system 1 according to a preferable embodiment of the present invention. The screen sharing system 1 includes a user terminal 10, a destination user terminal 100, and a public line network 5 (e.g. the Internet network, a third and a fourth generation networks).

The user terminal 10 is connected with the destination user terminal 100 by P2P connection through the public line network 5 or short distance radiocommunication to perform data communication. The destination user terminal 100 is connected with the user terminal 10 by P2P connection through the public line network 5 or short distance radiocommunication to perform data communication. The user terminal 10 sequentially transceives shared screen data to and from the destination user terminal 100.

The user terminal 10 and the destination user terminal 100 may be an information terminal with a capability of allowing a user to browse web pages and execute various applications. These terminals are an information device or an electrical appliance with the functions to be described later. For example, the user terminal 10 and the destination user terminal 100 may be a mobile phone, a smart phone, a complex printer, a television, a network device such as a router or a gateway, and a computer. These terminals may also be a white good such as a refrigerator or a washing machine. These terminals may also be an information appliance such as a telephone, a netbook terminal, a slate terminal, an electronic book terminal, an electronic dictionary terminal, a portable music player, and a portable content player and recorder.

Functions

Figure 3:
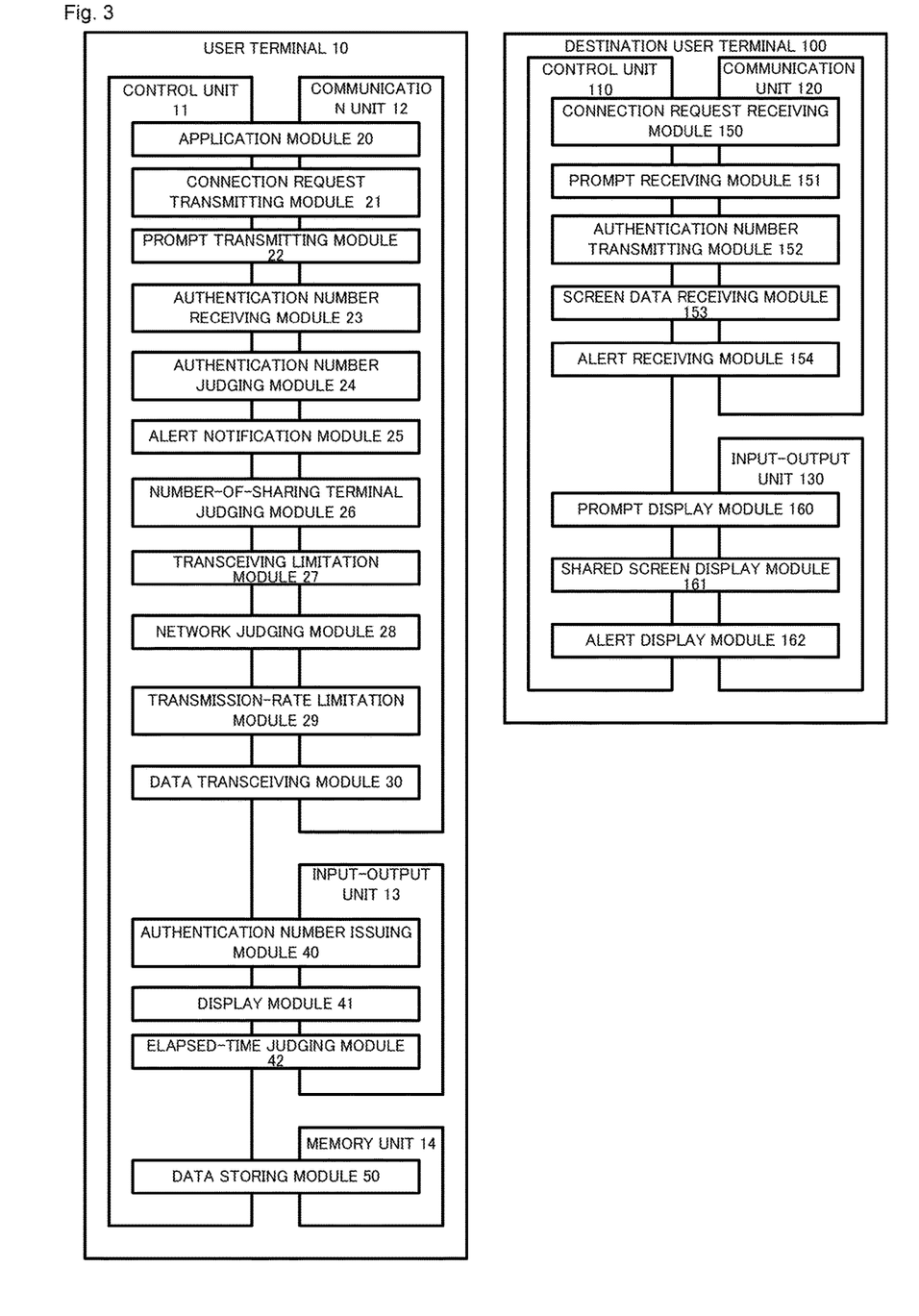
FIG. 3 shows a functional block diagram of the user terminal 10 and the destination user terminal 100.

FIG. 3 shows a functional block diagram of the user terminal 10 and the destination user terminal 100 to show the relationship among the functions.

The user terminal 10 includes a control unit 11 including a central processing unit (hereinafter referred to as "CPU"), a random access memory (hereinafter referred to as "RAM"), and a read only memory (hereinafter referred to as "ROM"); and a communication unit 12 including a Wireless Fidelity or Wi-Fi® enabled device complying with, for example, IEEE 802.11, or a wireless device complying with the IMT-2000 standard such as the third generation mobile communication system. The communication unit 12 may include a wired device for LAN connection. The user terminal 10 may also include a device that performs near field communication such as IR communication.

The user terminal 10 also includes an input-output unit 13 including a display unit displaying data and images that have been processed by the control unit 12; a touch panel, a keyboard, and a mouse that receive an input from the user; and a timer measuring time. The user terminal 10 also includes a storage unit as a memory unit 14 such as a hard disk or a semiconductor memory to store data.

In the user terminal 10, the control unit 11 reads a predetermined program to run an application module 20, a connection request transmitting module 21, a prompt transmitting module 22, an authentication number receiving module 23, an authentication number judging module 24, an alert notification module 25, a number-of-sharing terminal judging module 26, a transceiving limitation module 27, a network judging module 28, a transmission-rate limitation module 29, and a data transceiving module 30 in cooperation with the communication unit 12. Furthermore, in the user terminal 10, the control unit 11 reads a predetermined program to run an authentication number issuing module 40, a display module 41, and an elapsed-time judging module 42 in cooperation with the input-output unit 13. Still furthermore, in the user terminal 10, the control unit 11 reads a predetermined program to run a data storing module 50 in cooperation with the memory unit 14.

The destination user terminal 100 includes a control unit 110 including a central processing unit (hereinafter referred to as "CPU"), a random access memory (hereinafter referred to as "RAM"), and a read only memory (hereinafter referred to as "ROM"); and a communication unit 120 including a Wireless Fidelity or Wi-Fi® enabled device complying with, for example, IEEE 802.11, or a wireless device complying with the IMT-2000 standard such as the third generation mobile communication system in the same way as the user terminal 10. The communication unit 120 may include a wired device for LAN connection. The destination user terminal 100 may also include a device that performs near field communication such as IR communication.

The destination user terminal 100 also includes an input-output unit 140 including a display unit displaying data and images that have been processed by the control unit 120; and also including a touch panel, a keyboard, and a mouse that receive an input from the user.

In the destination user terminal 100, the control unit 110 reads a predetermined program to run a connection request receiving module 150, a prompt receiving module 151, an authentication number transmitting module 152, a screen data receiving module 153, and an alert receiving module 154 in cooperation with the communication unit 120. Furthermore, in the destination user terminal 100, the control unit 110 reads a predetermined program to run a prompt display module 160, a shared screen display module 161, and an alert display module 162 in cooperation with the input-output unit 130.

Screen Sharing Process

Figure 4:
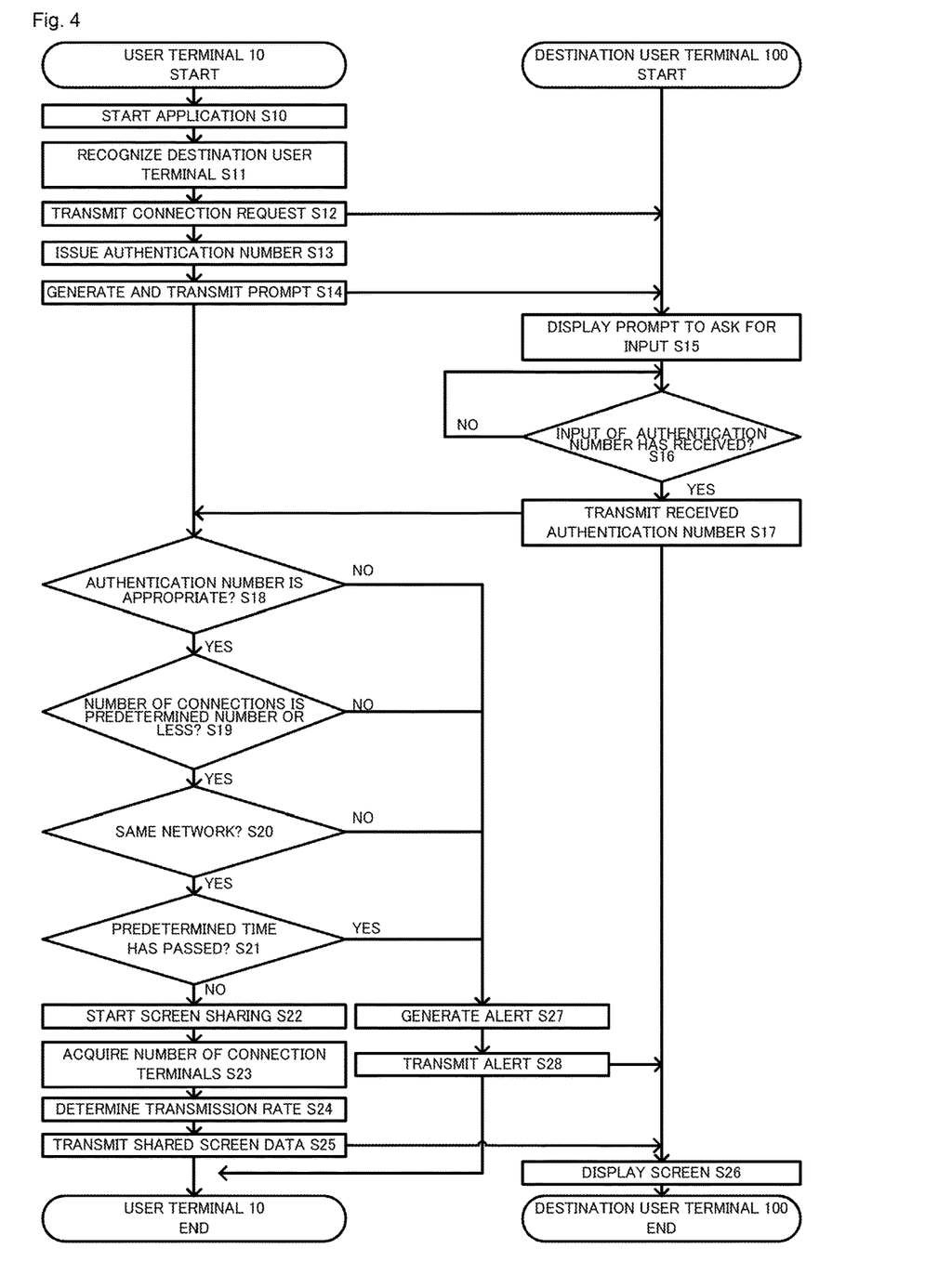
FIG. 4 shows a flow chart of the screen sharing process performed by the user terminal 10 and the destination user terminal 100.

FIG. 4 shows a flow chart of the screen sharing process performed by the user terminal 10 and the destination user terminal 100. The tasks executed by the modules of each of the above-mentioned devices will be explained below together with this process. The number of the destination user terminals 100 may be two or more.

First, the application module 20 of the user terminal 10 starts a screen sharing application involved in screen sharing in response to the input from the user (step S10).

The application module 20 of the user terminal 10 acquires data on the destination user terminal 100 with which the user terminal 10 is to perform screen sharing, to recognize the destination user terminal 100 (step S11). In the step S11, the application module 20 recognizes the number, the type, the screen resolution, the IP address, the product number, etc., of the destination user terminals 100 based on the acquired data on the destination user terminal 100.

The connection request transmitting module 21 of the user terminal 10 transmits a connection request to the destination user terminal 100 (step S12).

The connection request receiving module 150 of the destination user terminal 100 receives the connection request transmitted from the user terminal 10. The user terminal 10 and the destination user terminal 100 are directly communicated with each other through P2P connection by transceiving a connection request.

The authentication number issuing module 40 of the user terminal 10 issues an authentication number based on the start of the screen sharing application (step S13). In the step S13, the authentication number issued by the authentication number issuing module 40 is a combination of numbers, characters, signs, etc. The authentication number issuing module 40 displays the issued authentication number on the user terminal 10. This embodiment will be explained below assuming that this authentication number is "123456." Needless to say, the authentication number issued by the authentication number issuing module 40 may be other than this authentication number.

The prompt transmitting module 22 of the user terminal 10 generates a prompt to ask for an input of the authentication number and transmits the generated prompt to the destination user terminal 100 (step S14).

The prompt receiving module 151 of the destination user terminal 100 receives the prompt transmitted from the user terminal 10. The prompt display module 160 of the destination user terminal 100 displays the received prompt (step S15).

Figure 5:
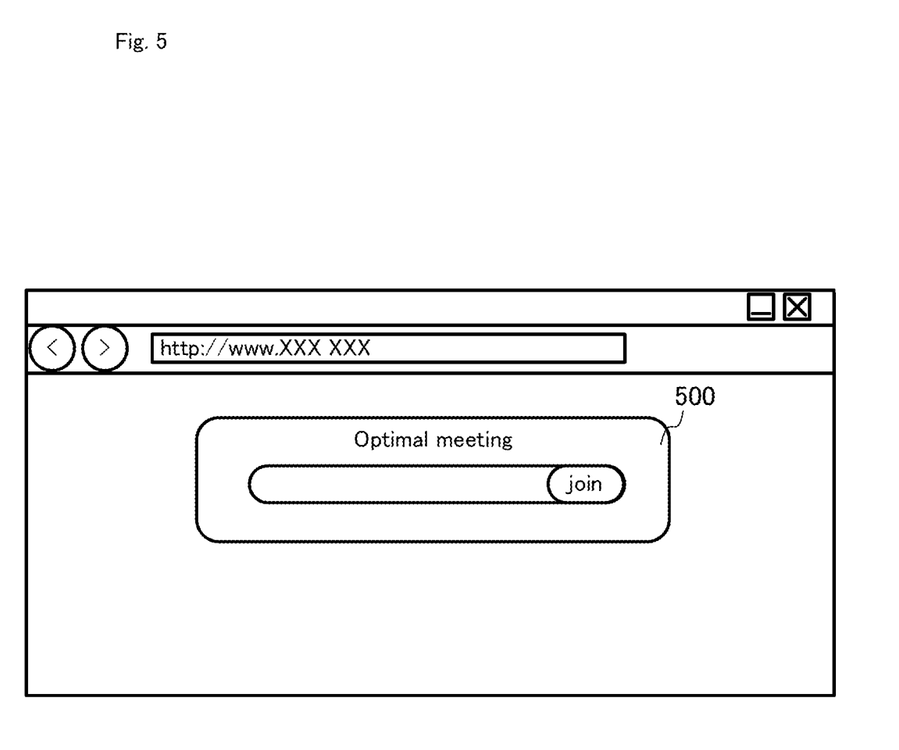
FIG. 5 shows a prompt asking for the authentication number, which is displayed on the destination user terminal 100.

FIG. 5 shows the prompt 500 that the prompt display module 160 displays in the step S15. In FIG. 5, the prompt display module 160 displays the prompt 500 in the window of a network browsing application. The prompt display module 160 judges whether or not the prompt display module 160 has received an input of the authentication number from the user (step S16).

In the step S16, if judging that the prompt display module 160 has not received an input of the authentication number (NO), the prompt display module 160 of the destination user terminal 100 repeats this step until receiving an input of the authentication number.

On the other hand, if the prompt display module 160 of the destination user terminal 100 judges that the prompt display module 160 has received an input of the authentication number (YES) in the step S16, the authentication number transmitting module 152 of the destination user terminal 100 transmits the received authentication number to the user terminal 10 (step S17).

The authentication number receiving module 23 of the user terminal 10 receives the authentication number transmitted from the destination user terminal 100. The authentication number judging module 24 of the user terminal 10 judges whether or not the received authentication number is appropriate (step S18). In the step S18, the authentication number judging module 24 judges whether or not the authentication number issued in the step S13 is the same as that transmitted from the destination user terminal 100 in the step S17 to judge whether or not the received authentication number is appropriate.

If the authentication number judging module 24 of the user terminal 10 judges that the authentication numbers are not the same (NO) in the step S18, the alert notification module 25 of the user terminal 10 performs the alert notification process to be described later (step S27).

On the other hand, if the authentication number judging module 24 of the user terminal 10 judges that the authentication numbers are the same (YES) in the step S18, the number-of-sharing terminal judging module 26 of the user terminal 10 judges whether or not the number of the destination user terminals 100 performing P2P connection is a predetermined number or less (step S19). In the step S19, the number-of-sharing terminal judging module 26 counts the number of the destination user terminals 100 that the application module 20 of the user terminal 10 has acquired, and judges whether or not the number of the destination user terminals 100 that transmitted the authentication number that the authentication number receiving module 23 has received is a predetermined number or less.

If the number-of-sharing terminal judging module 26 of the user terminal 10 judges that the counted number of the destination user terminals 100 is not a predetermined number or less (NO) in the step S19, the transceiving limitation module 27 of the user terminal 10 disconnect the P2P connection with the destination user terminal 100, and the alert notification module 25 of the user terminal 10 performs the alert notification process to be described later (step S27).

On the other hand, in the step S19, if the number-of-sharing terminal judging module 26 of the user terminal 10 judges that the counted number of the destination user terminals 100 is a predetermined number or less (YES) in the step S19, the network judging module 28 of the user terminal 10 judges whether or not the destination user terminal 100 is connected with the local area network with which the user terminal 10 is connected (step S20).

In the step S20, the network judging module 28 of the user terminal 10 acquires the IP address of the destination user terminal 100. The network judging module 28 compares the network address of the IP address of the destination user terminal 100 with that of the user terminal 10. If the network address of the IP address of the destination user terminal 100 is different from that of the user terminal 10, the network judging module 28 judges that the destination user terminal 100 is connected with a local area network different from the network with which the user terminal 10 is connected (NO) in the step S20, and the transceiving limitation module 27 of the user terminal 10 disconnects the P2P connection with the destination user terminal 100, and the alert notification module 25 of the user terminal 10 performs the alert notification process to be described later (step S27).

On the other hand, if the network address of the IP address of the destination user terminal 100 is the same as that of the user terminal 10, the network judging module 28 judges that the destination user terminal 100 is connected with the local area network with which the user terminal 10 is connected (YES) in the step S20, the elapsed-time judging module 42 of the user terminal 10 judges whether or not a predetermined time has passed since the user terminal 10 issued the authentication number transmitted from the destination user terminals 100.

In the step S20, the network judging module 28 of the user terminal may judge whether or not to allow share screen data with only the destination user terminal 100 with a previously specified IP address. In this case, the network judging module 28 only has to acquire the IP address of the destination user terminal 100 and judge whether or not this acquired IP address is the same as the previously specified IP address. If judging that the acquired IP address is the same as the specified IP address, the network judging module 28 only has to perform the step S21. If the network judging module 28 judges that the acquired IP address is not the same as the specified IP address, the alert notification module 25 of the user terminal 10 may perform the alert notification process to be described later. The number of the specified IP address is not limited to one and may be two or more. Moreover, the specified IP address may be not be an IP address itself but the network address of an IP address. In this case, the network judging module 28 only has to judge whether or not the network address of the IP address acquired from the destination user terminal 100 is the same as that of the user terminal 10.

In the step S21, the elapsed-time judging module 42 of the user terminal 10 judges if the predetermined time has passed since the user terminal 10 issued the authentication number in the step S13. If the elapsed-time judging module 42 judges that a predetermined time has passed since the user terminal 10 issued the authentication number (YES) in the step S21, the alert notification module 25 of the user terminal 10 performs the alert notification process to be described later (step S27).

On the other hand, if the elapsed-time judging module 42 of the user terminal 10 judges that a predetermined time has not passed since the user terminal 10 issued the authentication number (NO) in the step S21, the application module 20 of the user terminal 10 starts screen sharing with the destination user terminal 100 (step S22).

The number-of-sharing terminal judging module 26 of the user terminal 10 acquires the number of the destination user terminals 100 currently performing screen sharing (step S23).

Figure 6:
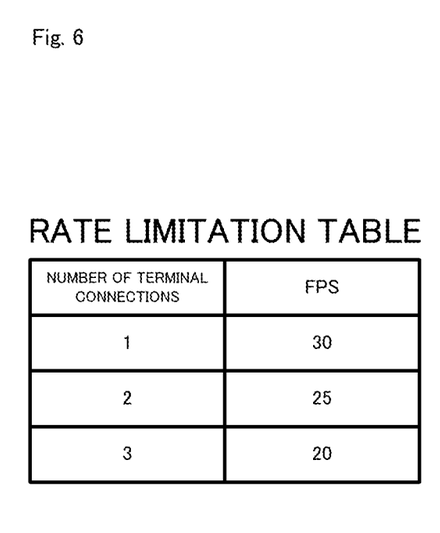
FIG. 6 shows a rate limitation table stored by the user terminal 10.

The transmission-rate limitation module 29 of the user terminal 10 limits the transmission rate indicating the shared screen data transmission rate based on the rate limitation table shown in FIG. 6 that the data storing module 50 of the user terminal 10 previously stores and based on the number of the terminals that is acquired in the step S23 (step S24). In the step S24, the transmission-rate limitation module 29 previously retrieves the transmission rate associated with the number of the terminal connections stored in the rate limitation table shown in FIG. 6 that the data storing module 50 stores, based on the number of the terminals that is acquired in the step S23. The transmission-rate limitation module 29 determines the transmission rate to transmit shared screen data to the destination user terminal 100 based on the retrieved transmission rate.

Rate Limitation Table

FIG. 6 shows a rate limitation table that the data storing module 50 of the user terminal 10 stores. In FIG. 6, the data storing module 50 associates and stores the number of the destination user terminal 100 sharing screen data with the transmission rate at which the user terminal 10 and the destination user terminal 100 transceives shared screen data to and from each other. Specifically, the data storing module 50 associates and stores the number of the terminal connections that indicates the number of the destination user terminals 100 with frames per second (hereinafter referred to as "FPS") that indicates the transmission rate. In FIG. 6, the data storing module 50 associates and stores the number of the terminal connections "1" with FPS "30." In the same way, the data storing module 50 also associates and stores the numbers of the terminal connections "2" and "3" with FPSs "25" and "20," respectively.

The number of the terminal connections and FPS that the data storing module 50 stores may be more than those shown in FIG. 6. The value of FPS and the number of the terminal connections can be appropriately changed. The data storing module 50 may associate and store FPS with the number of the terminal connections that is more than a predetermined number. Specifically, the data storing module 50 of the user terminal 10 may associate FPS "20" with the number of the terminal connections of 4 or more or may associate FPS "30" with the number of the terminal connections of 3 or less.

The data transceiving module 30 of the user terminal 10 transmits its screen data to the destination user terminal 100 as shared screen data at the transmission rate limited in the step S24 (step S25).

The screen data receiving module 153 of the destination user terminal 100 receives the shared screen data transmitted from the user terminal 10. The shared screen display module 161 of the destination user terminal 100 displays the shared screen data shown in FIG. 7 based on the received shared screen data (step S26).

Figure 7:
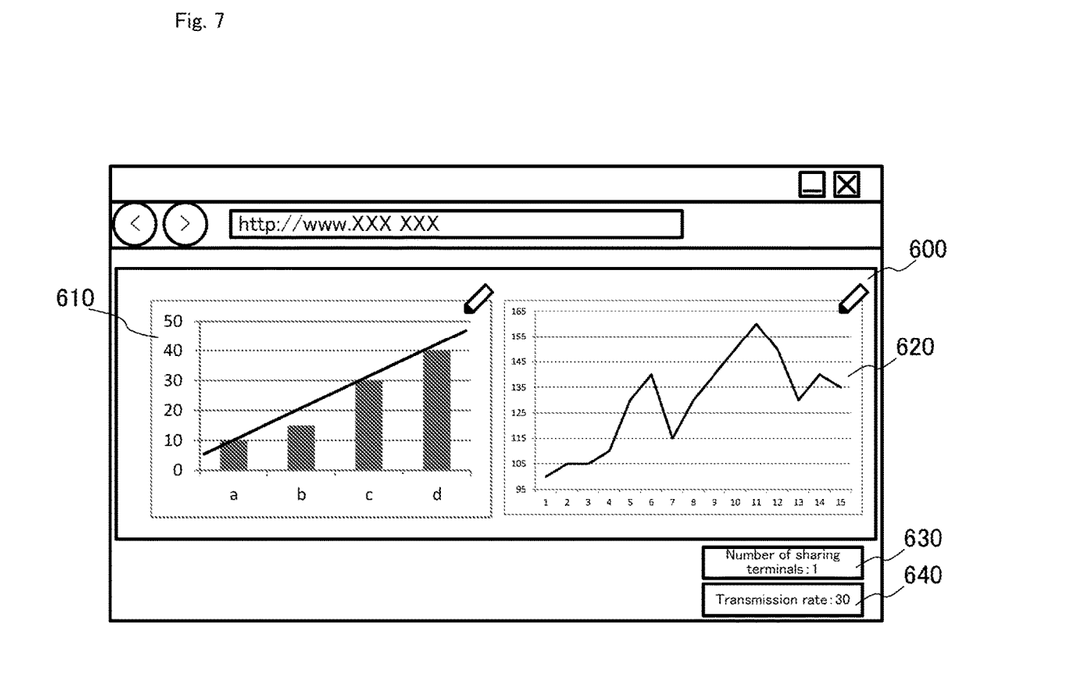
FIG. 7 shows a shared screen displayed on the destination user terminal 100.

FIG. 7 shows a shared screen displayed by the shared screen display module 161 of the destination user terminal 100. The shared screen display module 161 displays a window frame 600, a number-of-sharing terminal display frame 630, and a transmission rate display frame 640. The shared screen display module 161 displays the shared screens 610 and 620 in this window frame 600. The number of shared screens displayed in the window frame 600 is not limited to two and may be one or more than two unlike this embodiment. The position, the form, and the content of the number-of-sharing terminal display frame 630 and the transmission rate display frame 640 may be appropriately changed. Not only the user terminal 10 transmits shared screen data, but also the destination user terminal 100 may transmit shared screen data, and then the user terminal 10 may receive and display it.

The order of the above-mentioned steps S19 to S21 can be appropriately changed.

Alert Notification Process

The alert generation process of the step S27 and the following steps will be explained below.

Figure 8:
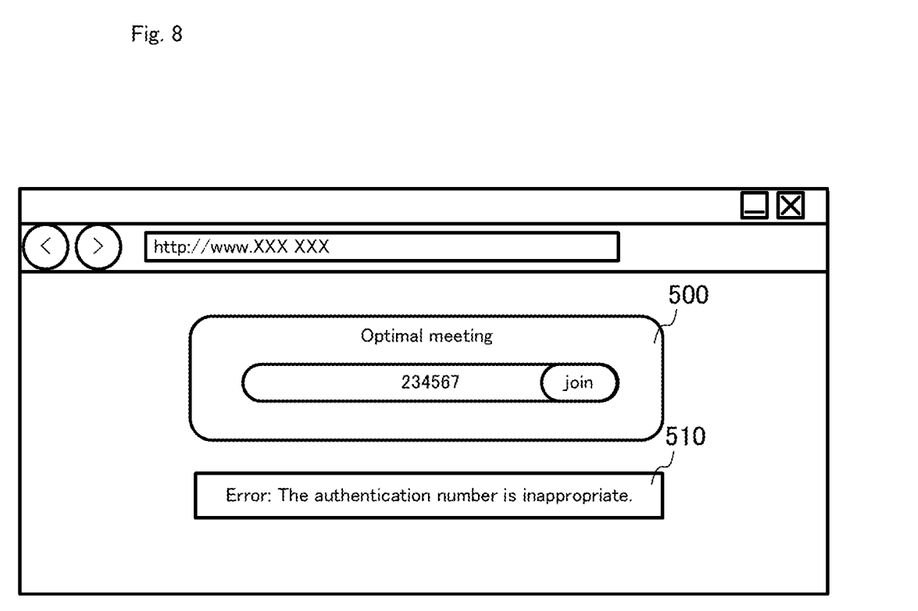
FIGS. 8, 9, 10, and 11 show an alert notification displayed on the destination user terminal 100.

If the authentication number judging module 24 of the user terminal 10 judges whether or not the authentication numbers are not the same (NO) in the step S18, the alert notification module 25 of the user terminal 10 generates the alert notifying that the authentication number is inappropriate (step S27). The alert notification module 25 transmits the generated alert to the destination user terminal 100 (step S28). The alert receiving module 154 of the destination user terminal 100 receives the alert transmitted from the user terminal 10. The alert display module 162 of the destination user terminal 100 displays the alert notification screen shown in FIG. 8 based on the received alert. FIG. 8 shows an alert notification screen displayed by the alert display module 162. In FIG. 8, the alert display module 162 displays the notification that the authentication number is inappropriate, in the alert frame 510 (step S26).

Figure 9:
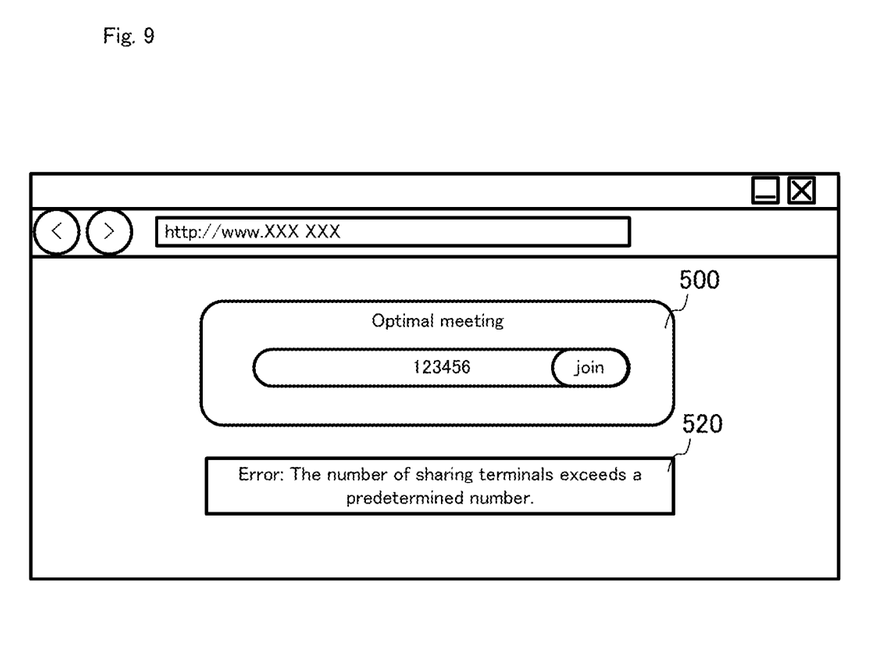

On the other hand, if the number-of-sharing terminal judging module 26 of the user terminal 10 judges that the counted number of the destination user terminals 100 is not a predetermined number or less (NO) in the step S19, the alert notification module 25 of the user terminal 10 generates the alert notifying that the number of the terminal connections exceeds the predetermined number (step S27). The alert notification module 25 transmits the generated alert to the destination user terminal 100 (step S28). The alert receiving module 154 of the destination user terminal 100 receives the alert transmitted from the user terminal 10. The alert display module 162 of the destination user terminal 100 displays the alert notification screen shown in FIG. 9 based on the received alert. FIG. 9 shows an alert notification screen displayed by the alert display module 162. In FIG. 9, the alert display module 162 displays the notification that the number of the terminal connections exceeds a predetermined number, in the alert frame 510 (step S26).

Figure 10:
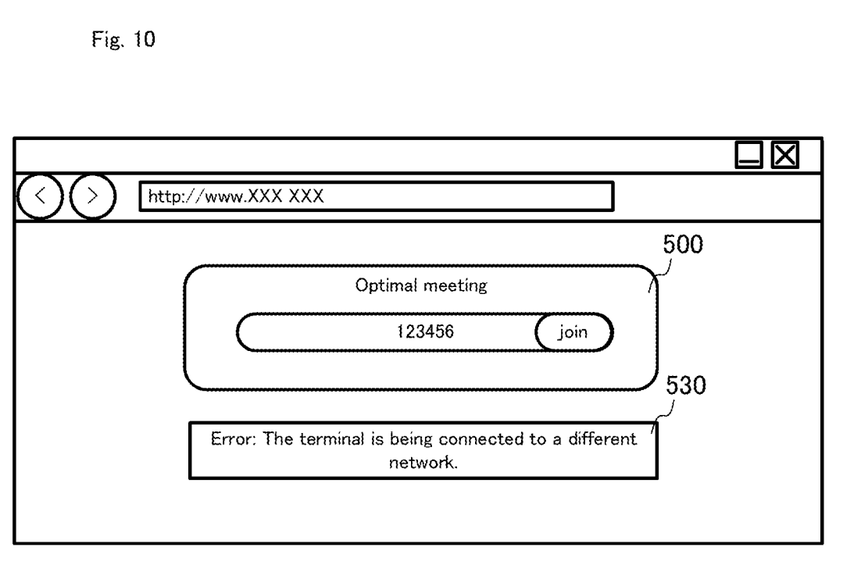

If the network judging module 28 of the user terminal 10 judges that the user terminal 10 is not connected with the local area network with which the destination user terminal 100 is connected (NO) in the step S20, the alert notification module 25 of the user terminal 10 generates the alert notifying that the destination user terminal 100 is connected with a different local area network (step S27). The alert notification module 25 transmits the generated alert to the destination user terminal 100 (step S28). The alert receiving module 154 of the destination user terminal 100 receives the alert transmitted from the user terminal 10. The alert display module 162 of the destination user terminal 100 displays the alert notification screen shown in FIG. 10 based on the received alert. FIG. 10 shows an alert notification screen displayed by the alert display module 162. In FIG. 10, the alert display module 162 displays the notification that the destination user terminal 100 is connected with a different local area network, in the alert frame 510 (step S26).

Figure 11:
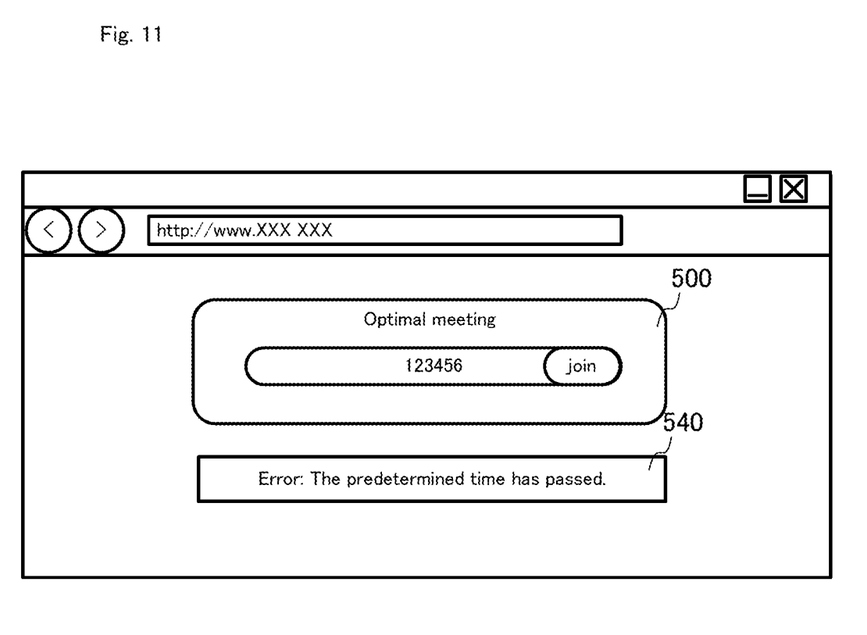

If the elapsed-time judging module 42 of the user terminal 10 judges that a predetermined time has passed since the user terminal 10 issued the authentication number (YES) in the step S21, the alert notification module 25 of the user terminal 10 generates the alert notifying that a predetermined time has passed since the authentication number was issued (step S27). The alert notification module 25 transmits the generated alert to the destination user terminal 100 (step S28). The alert receiving module 154 of the destination user terminal 100 receives the alert transmitted from the user terminal 10. The alert display module 162 of the destination user terminal 100 displays the alert notification screen shown in FIG. 11 based on the received alert. FIG. 11 shows an alert notification screen displayed by the alert display module 162. In FIG. 11, the alert display module 162 displays the notification in the alert frame 510 that a predetermined time has passed since the authentication number was issued (step S26).

Other Embodiments

The user terminal may previously store data on the SIM card mounted on a destination user terminal and share screen data with a destination user terminal with this SIM card. In this case, the user terminal may acquire data on the SIM card mounted on the destination user terminal and compare this data with the stored data on the SIM card. If these data are the same, the user terminal may start sharing screen data with the destination user terminal. If these data are not the same, the user terminal should not share screen data with the destination user terminal. The number of SIM cards stored in the user terminal may be one or may be two or more.

The user terminal may also previously store the MAC address of a destination user terminal and share screen data with a destination user terminal with this stored MAC address. In this case, the user terminal may acquire the MAC address of the destination user terminal and compare this MAC address with the stored MAC address. If these MAC addresses are the same, the user terminal may start sharing screen data with the destination user terminal. If these MAC addresses are not the same, the user terminal should not share screen data with the destination user terminal. The number of MAC addresses in the user terminal may be one or may be two or more.

The user terminal may also previously store the phone number of a destination user terminal and share screen data with a destination user terminal with this stored phone number. In this case, the user terminal may acquire the phone number of the destination user terminal and compare this phone number with the stored phone number. If these phone numbers are the same, the user terminal may start sharing screen data with the destination user terminal. If these phone numbers are not the same, the user terminal should not share screen data with the destination user terminal. The number of phone numbers stored in the user terminal may be one or may be two or more. The user terminal may store a phone number by registering the phone number in an address book application. In this case, the user terminal only has to compare a phone number registered in this address book application with the acquired phone number of the destination user terminal.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it). The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Screen sharing system
5 Public line network
10 User terminal
100 Destination user terminal

What is claimed is:

1. A user terminal for screen sharing with two or more destination user terminals, comprising:
   a communication device; and
   at least one processor that:
      receives a connection request for screen sharing from a user;
      issues an authentication number to specify the destination user terminal with which the user terminal is to perform screen sharing, in response to the connection request;
      directly connects, via the communication device, with the destination user terminal;
      allows, via the communication device, the destination user terminal to display a prompt to ask for an input of the authentication number;
      authenticates the authentication number in response to receiving, via the communication device, the authentication number from the destination user terminal;

judges whether the destination user terminal is connected with a local area network with which the user terminal is connected;

disconnects, via the communication device, a connection with the destination user terminal when the destination user terminal is not connected with the local area network with which the user terminal is connected; and sequentially transceives, via the communication device, shared screen data to and from the destination user terminal when the authentication number is appropriate and the destination user terminal is connected with the local area network with which the user terminal is connected.

2. The user terminal according to claim 1, wherein the at least one processor connects with two or more destination user terminals, and limits the shared screen data transmission rate when the number of the destination user terminals is a predetermined number or more.

3. The user terminal according to claim 1, wherein the at least one processor counts the destination user terminal to which shared screen data is transmitted and displays the counted number of the destination user terminal on the user terminal itself or the destination user terminal.

4. The user terminal according to claim 1, wherein the at least one processor judges whether or not a predetermined time has passed since the authentication number was issued, and does not receive an input of the authentication number when the predetermined time has passed.

5. A method for sharing a screen with a destination user terminal by at least one processor by a user terminal, comprising the steps of:

receiving a connection request for screen sharing from a user;

issuing an authentication number to specify the destination user terminal with which the user terminal is to perform screen sharing, in response to the connection request;

directly connecting, via a communication device, with the destination user terminal;

allowing, via the communication device, the destination user terminal to display a prompt to ask for an input of the authentication number;

authenticating the authentication number in response to receiving, via the communication device, the authentication number from the destination user terminal;

judging whether the destination user terminal is connected with a local area network with which the user terminal is connected;

disconnecting, via the communication device, a connection with the destination user terminal when the destination user terminal is not connected with the local area network with which the user terminal is connected; and sequentially transceiving, via the communication device, shared screen data to and from the destination user terminal when the authentication number is appropriate and the destination user terminal is connected with the local area network with which the user terminal is connected.

6. The method according to claim 5, wherein directly connecting with the destination user terminal includes directly connecting with two or more destination user terminals, and wherein the method further comprises limiting the shared screen data transmission rate when the number of the destination user terminals is a predetermined number or more.

7. A system for screen sharing, comprising a user terminal and a destination user terminal, the user terminal and the destination user terminal performing screen sharing with each other, wherein the user terminal includes:

a communication device; and at least one processor that:

receives a connection request for screen sharing from a user;

issues an authentication number to specify the destination user terminal with which the user terminal is to perform screen sharing, in response to the connection request;

directly connects, via the communication device, with the destination user terminal;

allows, via the communication device, the destination user terminal to display a prompt to ask for an input of the authentication number;

authenticates the authentication number in response to receiving, via the communication device, the authentication number from the destination user terminal;

judges whether the destination user terminal is connected with a local area network with which the user terminal is connected;

disconnects, via the communication device, a connection with the destination user terminal when the destination user terminal is not connected with the local area network with which the user terminal is connected; and sequentially transceives, via the communication device, shared screen data to and from the destination user terminal when the authentication number is appropriate and the destination user terminal is connected with the local area network with which the user terminal is connected, and wherein the destination user terminal receives and displays the shared screen data transmitted from the user terminal.

8. The system according to claim 7, wherein the at least one processor connects with two or more destination user terminals, and limits the shared screen data transmission rate when the number of the destination user terminals is a predetermined number or more.

* * * * *